(12) United States Patent
Huang et al.

(10) Patent No.: US 9,780,959 B2
(45) Date of Patent: Oct. 3, 2017

(54) METHODS AND APPARATUS FOR POWER EFFICIENT BROADCASTING AND COMMUNICATION SYSTEMS

(71) Applicant: Neocific, Inc., Bellevue, WA (US)

(72) Inventors: Haiming Huang, Bellevue, WA (US); Xiaodong Li, Kirkland, WA (US); Titus Lo, Bellevue, WA (US); Kemin Li, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 43 days.

(21) Appl. No.: 14/596,109

(22) Filed: Jan. 13, 2015

(65) Prior Publication Data

US 2015/0124668 A1 May 7, 2015

Related U.S. Application Data

(60) Continuation of application No. 13/712,848, filed on Dec. 12, 2012, now Pat. No. 8,934,394, which is a
(Continued)

(51) Int. Cl.
*H04L 12/18* (2006.01)
*H04N 21/2385* (2011.01)
*H04N 21/262* (2011.01)
*H04N 21/442* (2011.01)
*H04N 21/61* (2011.01)
(Continued)

(52) U.S. Cl.
CPC ........ *H04L 12/1881* (2013.01); *H04L 5/0007* (2013.01); *H04L 5/14* (2013.01); *H04N 21/2385* (2013.01); *H04N 21/26208* (2013.01); *H04N 21/44209* (2013.01); *H04N 21/6131* (2013.01); *H04N 21/6582* (2013.01); *H04W 52/0216* (2013.01); *H04W 72/005* (2013.01); *H04L 1/0003* (2013.01); *H04L 1/0061* (2013.01); *H04L 1/18* (2013.01); *H04L 2001/0093* (2013.01); *H04W 72/04* (2013.01);
(Continued)

(58) Field of Classification Search
None
See application file for complete search history.

(56) References Cited

U.S. PATENT DOCUMENTS

| 6,081,697 | A | * | 6/2000 | Haartsen | ................. H03C 3/40 329/356 |
| 2001/0017853 | A1 | * | 8/2001 | Kikuchi | ............... H04N 21/238 370/335 |

(Continued)

*Primary Examiner* — Huy D Vu
*Assistant Examiner* — Bao G Nguyen
(74) *Attorney, Agent, or Firm* — Perkins Coie LLP

(57) ABSTRACT

A method and apparatus for content multicasting and broadcasting and data unicasting in a broadband multicarrier wireless communication system. A base station is configured to transmit, and a mobile station is configured to receive, a sequence of consecutive frames. The frames comprise two types: frames containing time-frequency resources for content multicasting and broadcasting via a single frequency network, and frames containing time-frequency resources for data unicasting without the use of a single frequency network. The two types of frames are intermixed in accordance with an intermixing configuration pattern. The intermixing configuration pattern is indicated by a bit-map contained in a scheduling signal.

15 Claims, 13 Drawing Sheets

Related U.S. Application Data division of application No. 13/422,829, filed on Mar. 16, 2012, now Pat. No. 8,457,081, which is a continuation of application No. 11/571,469, filed as application No. PCT/US2006/022376 on Jun. 6, 2006, now Pat. No. 8,155,098.

(60) Provisional application No. 60/688,937, filed on Jun. 9, 2005.

(51) Int. Cl.

| | | |
|---|---|---|
| *H04N 21/658* | (2011.01) | |
| *H04W 72/00* | (2009.01) | |
| *H04L 5/00* | (2006.01) | |
| *H04L 5/14* | (2006.01) | |
| *H04W 52/02* | (2009.01) | |
| *H04L 1/00* | (2006.01) | |
| *H04L 1/18* | (2006.01) | |
| *H04W 72/04* | (2009.01) | |
| *H04W 84/04* | (2009.01) | |
| *H04W 92/10* | (2009.01) | |

(52) U.S. Cl.
CPC .......... *H04W 84/042* (2013.01); *H04W 92/10* (2013.01); *Y02B 60/50* (2013.01)

(56) References Cited

U.S. PATENT DOCUMENTS

| | | | | |
|---|---|---|---|---|
| 2002/0031097 | A1* | 3/2002 | Jung | H04L 12/1818 370/270 |
| 2002/0162114 | A1* | 10/2002 | Bisher, Jr. | H04N 7/165 725/91 |
| 2005/0265280 | A1* | 12/2005 | Roh | H04L 27/2608 370/328 |
| 2006/0098567 | A1* | 5/2006 | Willenegger | H04W 72/005 370/206 |
| 2006/0198325 | A1* | 9/2006 | Gao | H04L 1/0057 370/270 |

* cited by examiner

METHODS AND APPARATUS FOR POWER EFFICIENT BROADCASTING AND COMMUNICATION SYSTEMS

CROSS-REFERENCE TO RELATED APPLICATION(S)

This application is a continuation of, and incorporates by reference in its entirety, U.S. patent application Ser. No. 13/712,848, now granted U.S. Pat. No. 8,934,394, entitled "METHODS AND APPARATUS FOR POWER EFFICIENT BROADCASTING AND COMMUNICATION SYSTEMS", filed on Dec. 12, 2012, which is a divisional of, and incorporates by reference in its entirety, U.S. patent application Ser. No. 13/422,829, now granted U.S. Pat. No. 8,457,081, entitled "METHODS AND APPARATUS FOR POWER EFFICIENT BROADCASTING AND COMMUNICATION SYSTEMS", filed on Mar. 16, 2012, which is a continuation of, and incorporates by reference in its entirety, U.S. patent application Ser. No. 11/571,469, now granted U.S. Pat. No. 8,155,098, entitled "METHODS AND APPARATUS FOR POWER EFFICIENT BROADCASTING AND COMMUNICATION SYSTEMS", having a 371 date of Oct. 9, 2008, which is a National Stage application of PCT/US06/22376, entitled "METHODS AND APPARATUS FOR POWER EFFICIENT BROADCASTING AND COMMUNICATION SYSTEMS", filed on Jun. 6, 2006, which claims the benefit of U.S. Provisional Patent Application No. 60/688,937, entitled "METHODS AND APPARATUS FOR POWER EFFICIENT BROADCASTING AND COMMUNICATION SYSTEMS", filed on Jun. 9, 2005. This application relates to U.S. Provisional Patent Application Nos. 60/665,184 and 60/665,205, filed on Mar. 25, 2005.

TECHNICAL FIELD

The disclosed embodiments relate, in general, to wireless communication and, in particular, to methods and apparatus for power efficient signal broadcasting and communication.

BACKGROUND

As a wireless service to mobile users, the transmission of multimedia is becoming as important as voice connectivity. It is forecasted that multimedia applications will include interactive data services such as gaming and internet access as well as on-demand video and audio services.

Digital video and audio broadcasting and multicasting are one class of wireless services. Some applications such as news-casting, sports-casting, and other types of multimedia entertainment require no or minimum interaction. The most efficient way to deliver these types of mass multimedia contents is broadcasting. Given these broadband wireless applications, the platform for the next generation wireless communications should deliver interactive data and broadcasting services at the same time. The design of such a platform with mixed applications must be well balanced, optimizing quality of service, efficiency, power consumption by mobile stations, etc.

A mobile station in continuous reception of a video broadcasting stream consumes significant amount of power, which becomes even a bigger challenge if the mobile station is running on battery. Furthermore, when data application traffic shares the same air link resource with the video streams, a video burst that utilizes the entire air link resource will cause a long delay for other applications such as for Transmission Control Protocol (TCP). This can become a major problem if some control data transmissions require swift responses, such as power control, hybrid automatic retransmission request (HARQ) feedback and channel quality information (CQI) measurement reports. The exclusive use of a resource for video broadcasting blocks these control messages and causes system performance problems.

DETAILED DESCRIPTION

Figure 1:
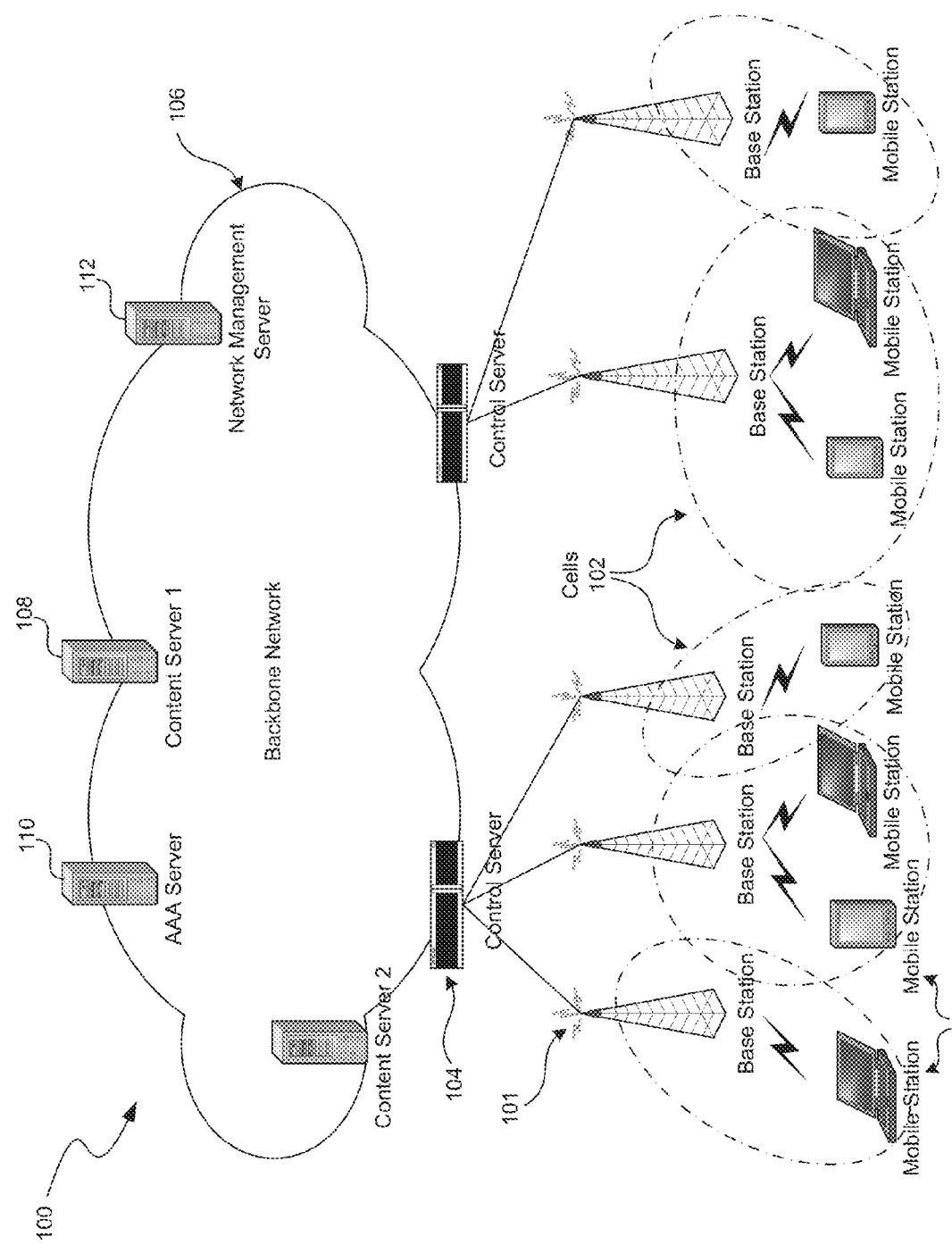
FIG. 1 illustrates examples of a system architecture of a cellular wireless system.

Methods and apparatus are disclosed herein for resource configuration in a cellular broadcasting and communication network of base stations and mobile stations. In this network a video stream can be transmitted from a base station to a mobile station as bursts of video and data frames are configured in a particular sequential manner. Special scheduling signals are designed to efficiently announce video burst information to the subscribing mobile stations, allowing the mobile stations to turn on their transceiver circuitry only when video bursts arrive. In a video burst, the available data resources, in addition to video resources, are used to transmit data application packets and/or special control information to the subscribing mobile stations. Methods and processes are also disclosed for a mobile station to use a single RF tuner within a system with multiple frequency bands.

The disclosed multiple access technology can be of any special format such as Code Division Multiple Access (CDMA), Time Division Multiple Access (TDMA), Frequency Division Multiple Access (FDMA), Orthogonal Frequency Division Multiple Access (OFDMA), or Multi-Carrier Code Division Multiple Access (MC-CDMA). Without loss of generality, OFDMA is employed as an example to illustrate the present invention. The system can also be either time division duplex (TDD) or frequency division duplex (FDD).

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

In order to minimize the power consumption of a mobile station, it is desirable to deliver video broadcasting data within a short period of time and fill up a video buffer of the mobile station (MS) so that it can be played back later. This only requires the radio frequency (RF) and the base-band transceivers of the mobile station to be powered up during the same short period. The rest of the time the transceiver can be shut down; minimizing the power consumption. Implementing such scheme, in a system with other types of data application, requires harmonizing various applications and optimizing the results.

In one embodiment, to reduce the power consumption of a receiving mobile station, a video stream is transmitted from a base station (BS) as bursts of video and data frames configured in a particular sequential manner. A mobile station can turn off its transmitting and receiving circuits during the periods between the video bursts. In a video burst, the available data resources, in addition to video resources, are used to transmit data application packets and/or special control information. Special scheduling signals are designed to efficiently announce video burst information to the subscribing mobile stations.

A video broadcasting application is used as an example to illustrate some aspects of the invention. More generally, the disclosed methods and apparatus can be applied to other applications that use broadcasting or multicasting and benefit from buffering data and playing it back to save power. Examples are music/audio broadcasting and multicasting-based data downloading. On the other hand, "data application" refers to other applications with non-broadcasting/multicasting nature, such as web access, voice over IP, and FTP.

Throughout the following specification, examples of a single frequency network (SFN) are used to illustrate the applications of video broadcasting; however, employing a SFN is not a requirement.

Cellular Broadcasting and Communication Systems

FIG. 1 depicts a typical wireless network 100, where there are a plurality of base stations (BS's) 101 each of which provides coverage to its designated area, normally called a cell 102. If a cell 102 is divided into sectors, from system engineering point of view each sector itself can be considered to be a cell. Therefore, the terms "cell" and "sector" are interchangeable in this context.

There is at least one control server 104 in a wireless network 100 for controlling one or multiple BS's 101. The control server 104 is connected to the BS's 101 via the backbone network 106, which can be either a wired network or a wireless network. The backbone network 106 can also be either a circuit switched network or a packet switched network. The backbone network 106 may connect to other servers in the system, such as a number of content servers 108, a number of network management servers 112, and/or a number of authentication/authorization/accounting (AAA) servers 110.

A BS 101 serves as a focal point to wirelessly distribute information to and collect information from its MS's 114, which are the communication interface between the users and the wireless network 100. The transmission from a BS 101 to an MS 114 is called a downlink and the transmission from an MS 114 to a BS 101 is called an uplink. The term "MS" also can represent a user terminal in a fixed wireless system or a portable device with a wireless communication interface.

In wireless applications such as digital video broadcasting, the SFN technology is used to alleviate the problem of interference between BS's 101. Using OFDM, BS's 101 simultaneously transmit the same broadcasting content while employing the same time/frequency resource. A receiver can then combine the received signals from different BS's 101 to boost its SNR (signal to noise ratio).

In the backbone network 106, the control server 104 coordinates the synchronized video broadcasting. When video stream packets are distributed from the control server 104 to the BS's 101, additional synchronization information is appended to the packets by a device called Distribution Adapter (DA). The video packet distribution network is built on top of the backbone network 106 via tunneling technologies.

For a video broadcasting packet, the BS 101 forwards the packet to a Receiving Adapter (RA), which extracts the synchronization information, and broadcasts the video simultaneously with other BS's 101.

Data application packets are transmitted to the BS 101 directly, without encapsulation, using tunneling protocols. The BS 101 separates data application packets from video broadcasting packets by their destination addresses and other properties. Data application packets bypass RA and are transmitted to MS's 114 according to a scheduling by each individual BS 101.

Video Frames

The physical media resource (e.g., radio or cable) in a multi-carrier communication system can be divided in both the frequency and time domains. This canonical division provides a high flexibility and fine granularity for resource sharing. The building-blocks of multi-carrier signals in the frequency domain are sub-carriers, a fixed number of which are within a particular spectral band or channel.

Figure 2:
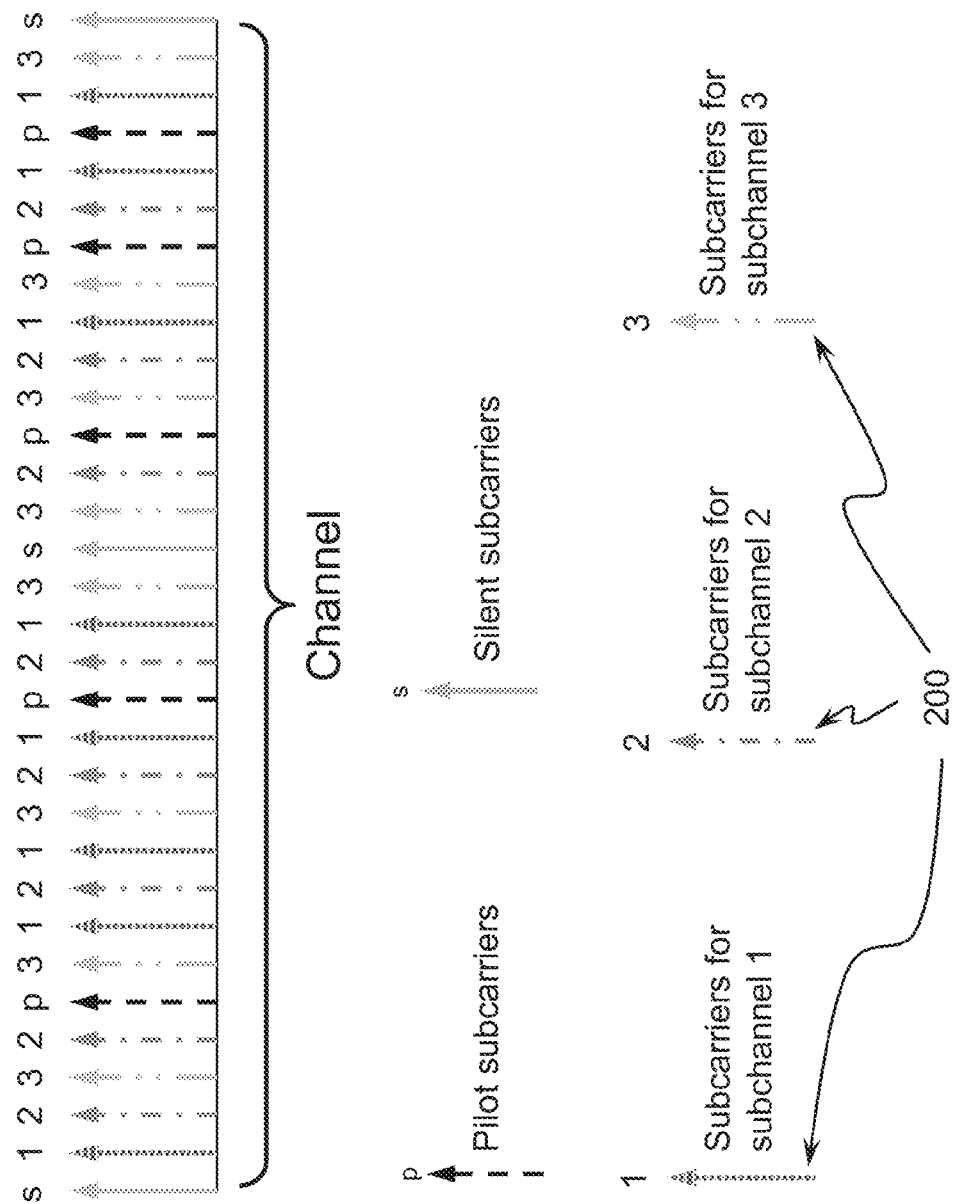
FIG. 2 illustrates an example of sub-carriers and sub-channels.

FIG. 2 depicts three types of sub-carriers, as follow:
1. Data sub-carriers 200, which carry information data;
2. Pilot sub-carriers, whose phases and amplitudes are predetermined and are made known to all receivers, and which are used for assisting system functions such as estimation of system parameters; and 3. Silent sub-carriers, which have no energy and are used as guard bands and DC carriers.

The data sub-carriers can be arranged in a particular manner into groups called sub-channels to support both scalability and multiple access. The pilot sub-carriers are also distributed over the entire channel in a predetermined manner. The sub-carriers forming one sub-channel are not necessarily adjacent to each other.

Figure 3:
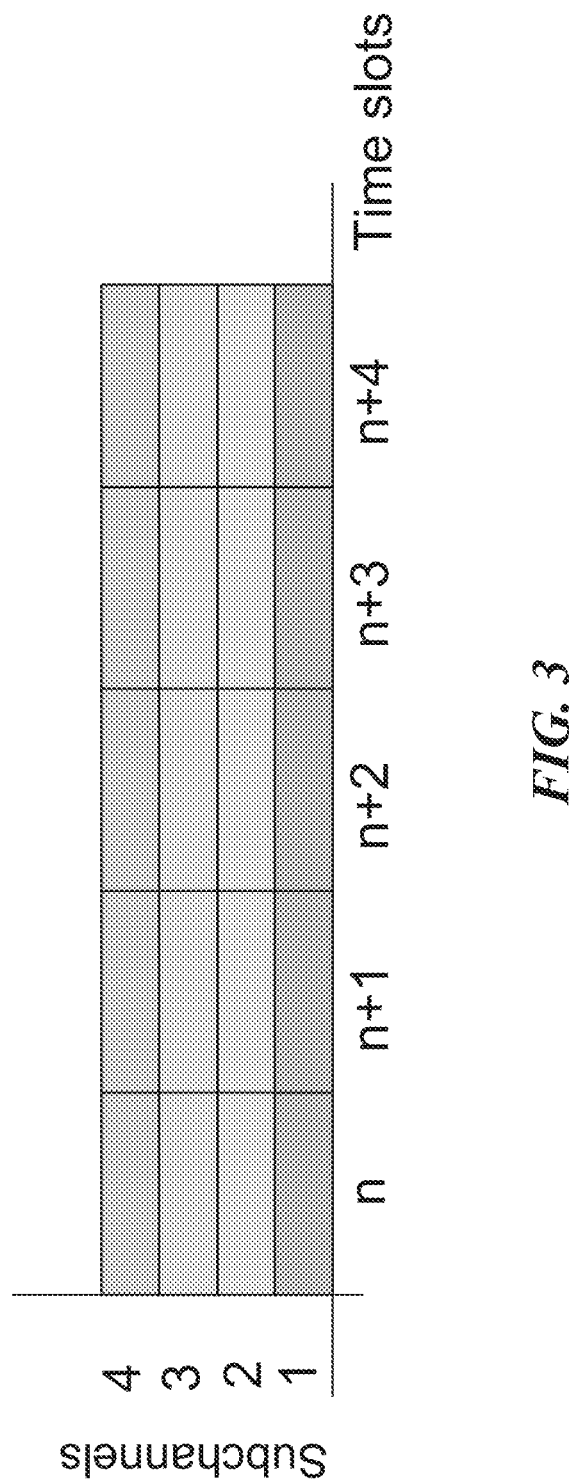
FIG. 3 illustrates an example of time and frequency resources.

The building-blocks of multi-carrier signals in the time domain are time slots to support multiple access. The resource division in both the frequency and time domains is depicted in FIG. 3, where the radio resource is divided into small units in both the frequency and time domains: sub-channels and time slots. The basic structure of a multi-carrier signal in the time domain is made up of time slots. A time slot may contain one or multiple OFDM symbols. A "frame," typically of a fixed length (e.g., 5 ms), may contain one or multiple slots.

In a broadcasting and communication system with a frame structure, the video broadcasting application and the data application use different air link resources. If SFN is used for the video broadcasting application, its reserved resource in a frame is called SFN video resource. A frame containing a video resource is called a video frame; otherwise, it is called a data frame.

Figure 4:
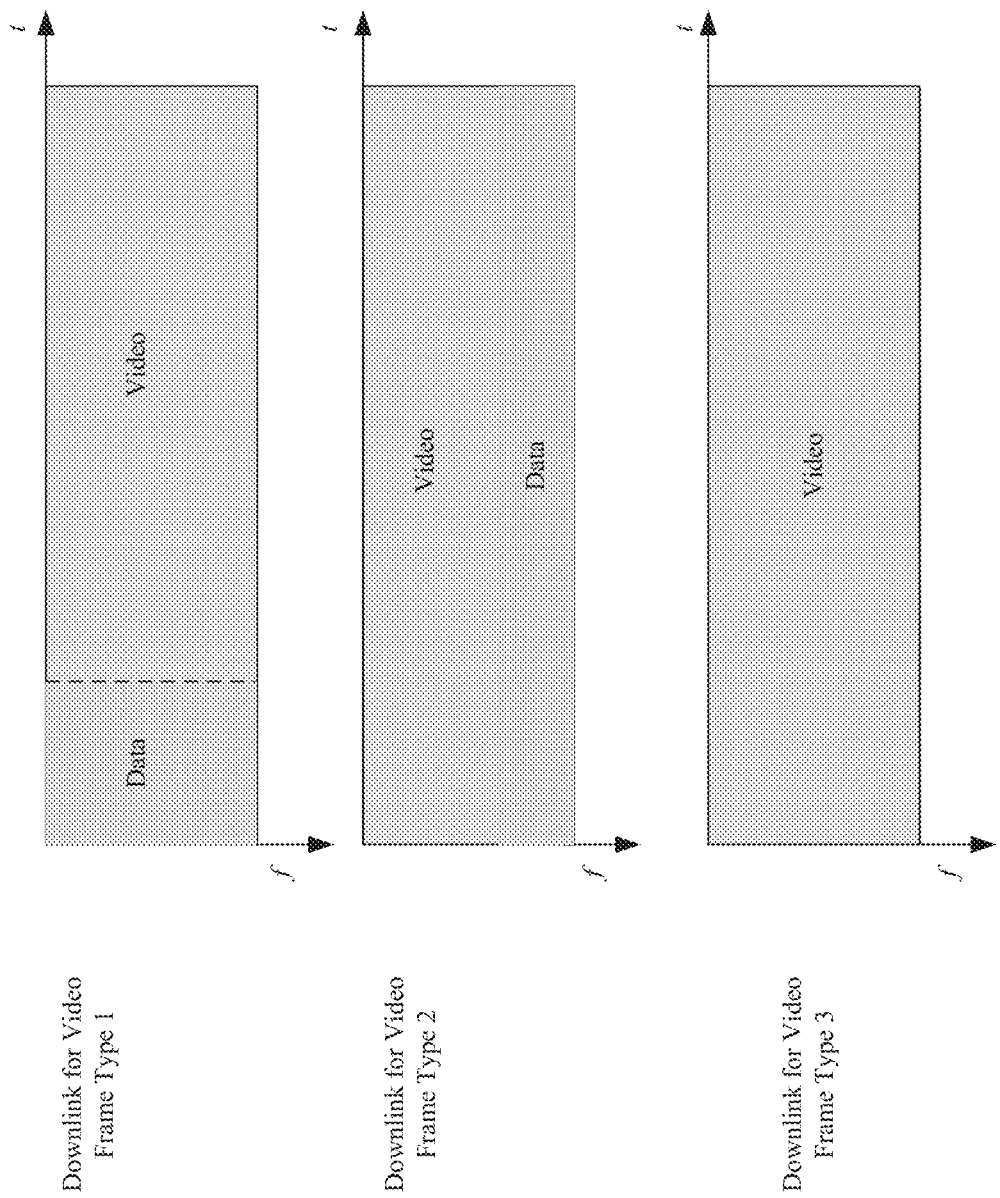
FIG. 4 illustrates three different types of video frames.

FIG. 4, while only illustrating the downlink, shows three different types of video frames. The first type contains both video and data resources. They are separated in the time domain using different OFDM symbols. In the second type frame, the video resource and the data resource are using different sub-carriers. The third type contains only the video resource.

A video broadcasting "stream" is defined as a stream for a particular video broadcasting program. For example, one stream carries CNN news channel program, the other carries video broadcasting information from FOX.

Each video stream is associated with a bit rate, which can be either fixed or variable. In order to support a certain bit rate, the number of video frames per second is derived based on the calculations of the video resource capacity. As an example, a system with an 8-MHz wireless channel and a 5-ms frame is used herein to illustrate the disclosed embodiments. It is further assumed that the system is sampling at 10 MHz and using 1024-point FFT. This example of a system's effective bandwidth is comprised of 600 OFDM sub-carriers. Each symbol in the system lasts about 100 ns; therefore, it has a total of 50 symbols within each frame.

In one embodiment, a frame is used either entirely or partially for video broadcasting. For example, the entire frame (all 50 symbols) is used for video broadcasting with 16QAM modulation and ½-rate coding, resulting in a frame capacity of 2×600×50=60K bits. With N video frames per second, the video stream bit rate is 60N Kbps. If a video stream requires 240 Kbps throughput, a burst of 4 video frames every second is enough. In contrast, if only a part of the frame, for example six symbols, is used as video resource, with the same 16-QAM and ½ rate coding, the video capacity per frame is 2×600×6=7.2K bits, in which case the transmission of a 144-Kbps video stream requires 20 frames per second.

Video Burst

A video burst is defined as a sequence of frames within a short period of time. For one video stream, the duration between the two consecutive video bursts is relatively longer than the length of the video burst itself. To reduce the power consumption of a receiving MS 114, a video stream can be transmitted from the BS 101 as video bursts configured in a particular sequential manner with both video and data frames. The temporal location and the configuration of a video burst are announced by a special message carrying the scheduling signal, wherein the special message is broadcasted periodically.

Figure 5:
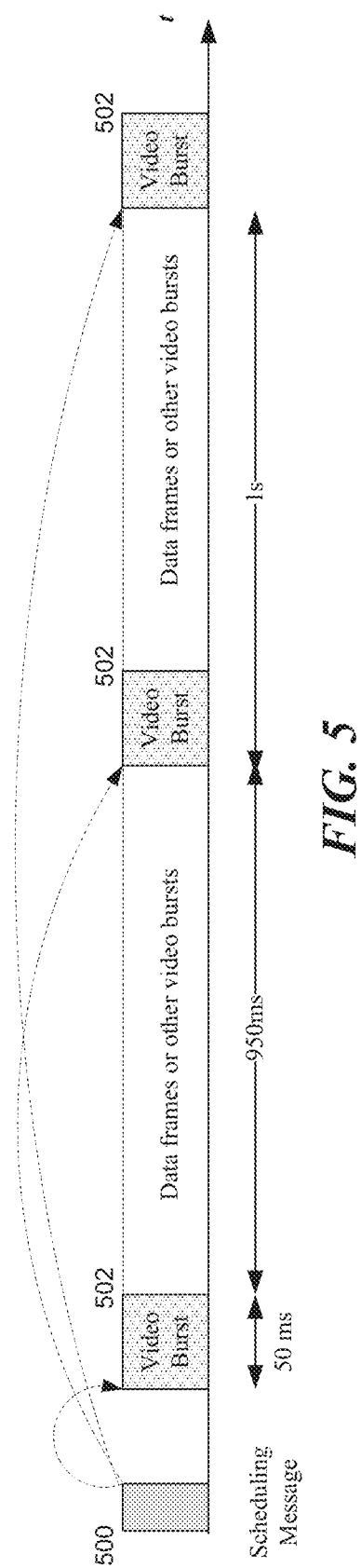
FIG. 5 illustrates video bursts along with a scheduling message pointing to their positions.

FIG. 5 illustrates the relationship of video bursts 502 with the scheduling message 500. The video burst takes about 50 ms, with a gap of 950 ms between two video bursts. The scheduling signal indicates the location of the video bursts as well as other control information. The format of the scheduling signal and its transmission mechanism is discussed below.

Figure 6:
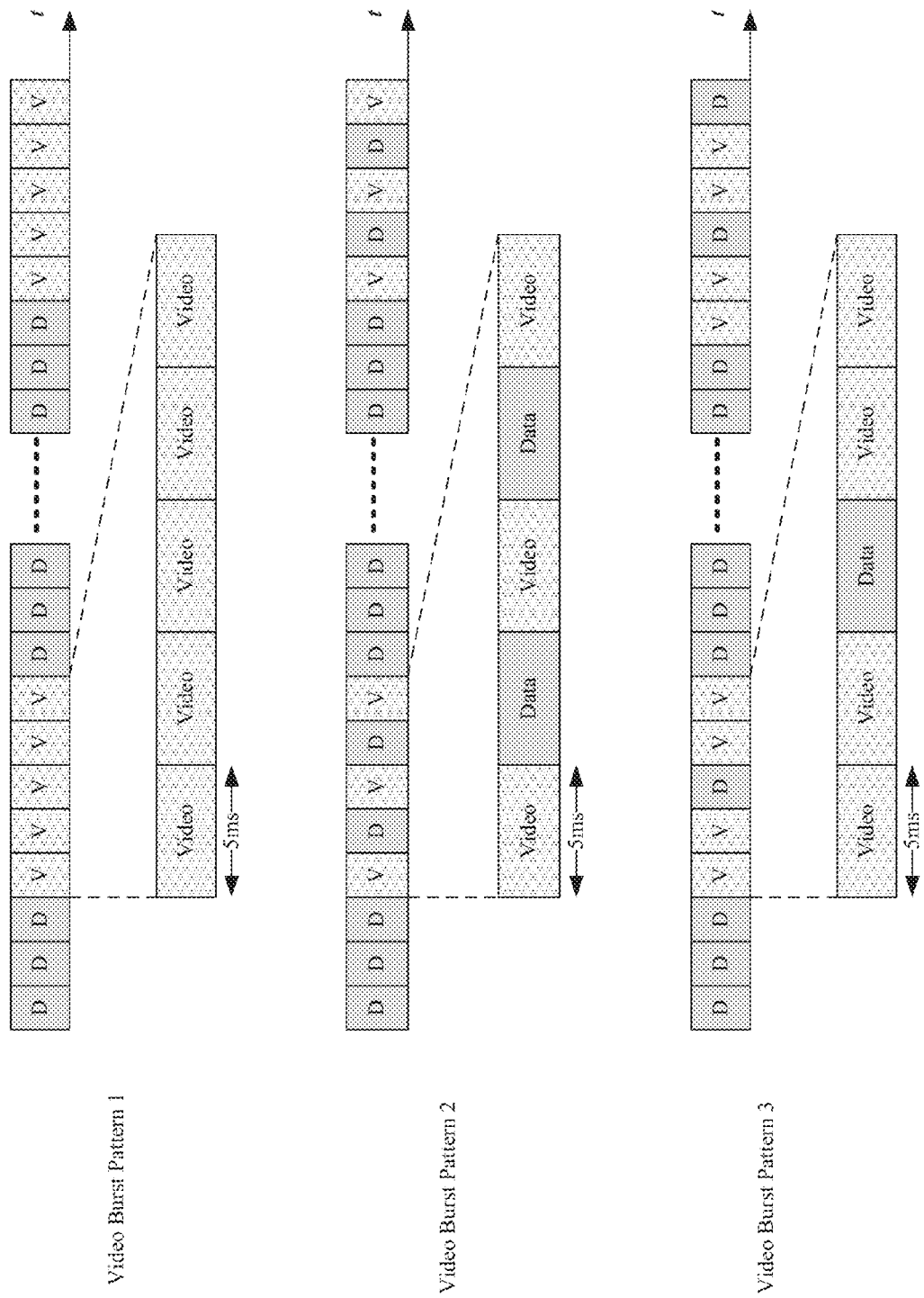
FIG. 6 illustrates different video burst patterns for a single video stream.

FIG. 6 illustrates three examples of "video burst patterns" for a single video stream, where video burst patterns are the interleaving video and data frames within a video burst. Different video burst patterns may be used, depending on the nature of the data applications. In the first pattern, a video burst has five consecutive video frames. In the second pattern the video burst has three video frames and, to mitigate the latency impact on the data applications, there is a data frame between the first and the second video frame and another data frame between the second and the third video frame. In this pattern the maximum latency between two neighboring data frames is only 5 ms, and the entire video burst lasts 5×5=25 ms. In the third depicted pattern the video burst has 4 video frames with a data frame between the second and the third video frame. With this pattern, the maximum delay between two neighboring data frames is 10 ms. The total video burst lasts 25 ms.

Transmitting a video stream by video bursts can reduce the power consumption of the receiving MS's 114. With such arrangement, each MS 114 can turn on its RF and base-band circuit to receive a video burst and shut them down subsequently to save power for a relatively long period, until the arrival of a next burst. The video burst pattern and its schedule is announced to all the receiving MS's 114 using scheduling signal. The video burst pattern for a video stream can be reconfigured over time. The pattern change is also announced to all the receiving MS's 114 through the scheduling signal.

Within a video burst, the data frames and the data resource of the video frames are called "available data resource." In one embodiment, the system can use the available data resource in a video burst to perform security key update, establishing network connection, paging, location update, resynchronization, or power control for the subscribing MS's 114.

In another embodiment, an MS 114 measures the receiving signal quality and collects statistics of the received video stream, such as the packet error rate. The BS 101 allocates a resource from the available data resource of the video burst for an MS 114 to report its CQI measurement and other statistics of the received video stream. When necessary, the MS 114 may be required to report which video stream it receives.

In yet another embodiment, since the receiving circuit in an MS 114 is turned on during its video burst, the BS 101 can notify the MS 114 about its newly arrived data application packets, using the available data resource in the burst. The MS 114 can also send uplink data packets to the BS 101 during the burst.

If there are only a small number of data application packets for downlink and uplink, the BS 101 and MS 114 can complete the transmission of data packets during a video burst. However, if the number of data packets exceeds the capacity of the available data resource in a video burst, the BS 101 and the MS 114 can coordinate to extend the power-on period to continue the data exchange.

Multiple Video Streams

Figure 7:
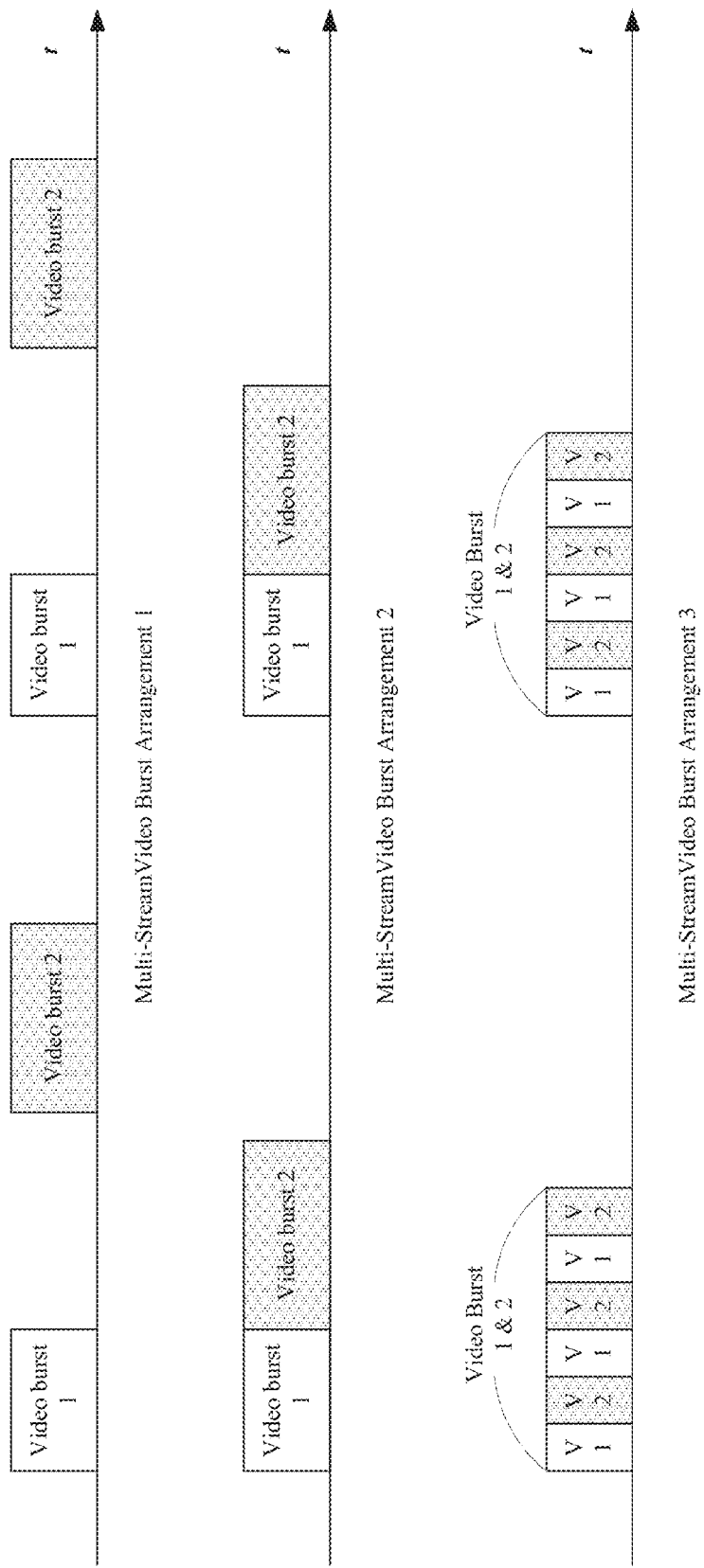
FIG. 7 illustrates different video-burst distributions for multiple video streams.

FIG. 7 depicts an embodiment wherein multiple video streams are transmitted with their own video bursts. The bursts associated with different video streams are evenly distributed, next to each other or overlapping/interleaving with each other. In the first example, Video burst 1 and Video burst 2 are evenly distributed over time. In the second example, Video burst 1 and Video burst 2 are next to each other. In the third example, Video burst 1 and Video burst 2 are overlapped and interleaved with each other.

In some systems, the number of supported video streams can change over time, which affects the video burst pattern and its distribution in the time domain. The video broadcasting resource in a system can be increased by:

1. increasing the number of video frames, while keeping the video burst pattern unchanged;
2. changing the video burst pattern so it contains less data frames; and/or
3. increasing the video resource in each video frame, which also affects the video burst pattern.

Figure 8:
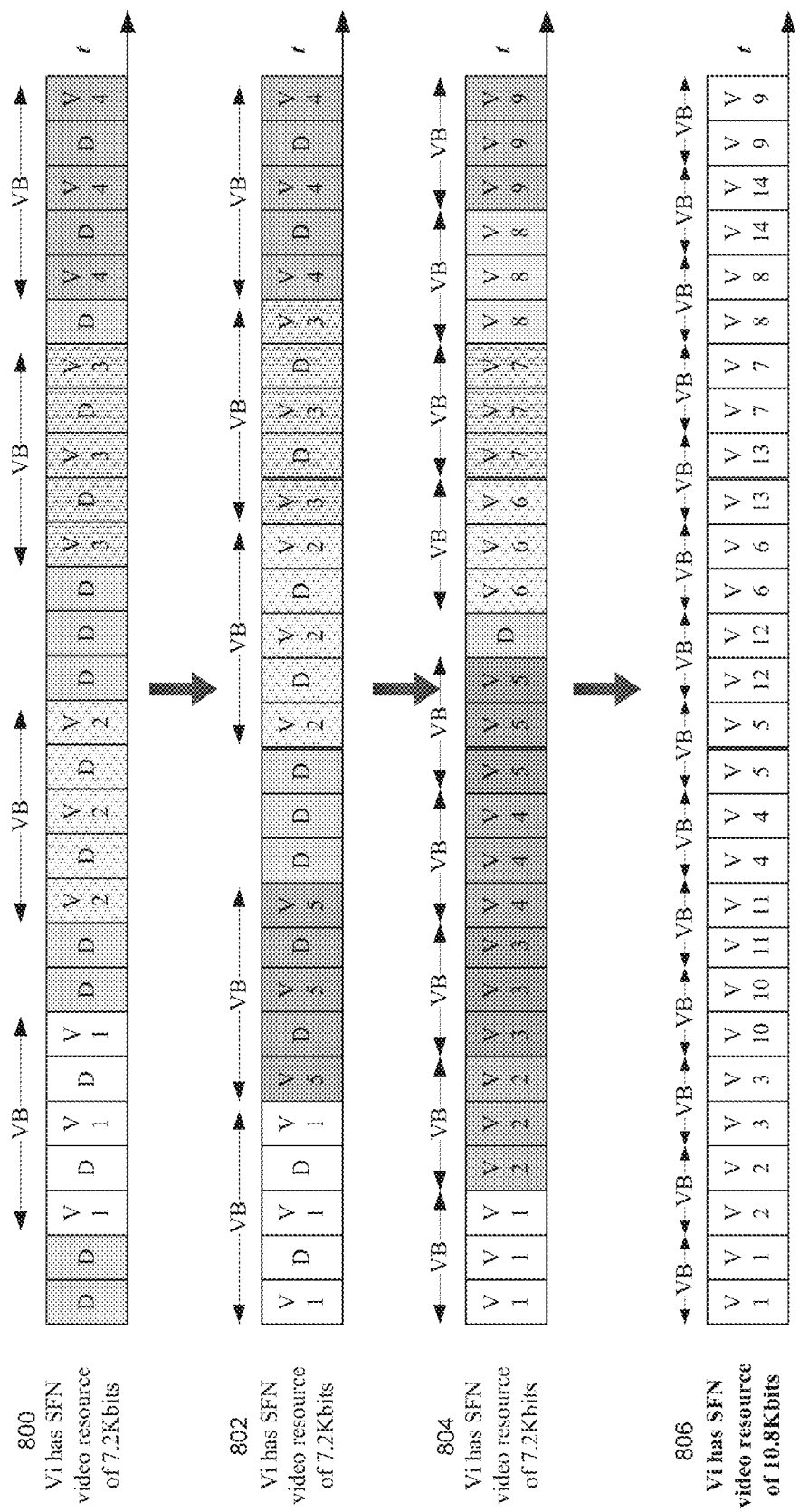
FIG. 8 illustrates an example of how a video burst and its video frame configuration change as the number of video streams increases.

FIG. 8 shows a number of system configuration transitions to increase video capacity. First, the data frames between video bursts in the configuration 800 are displaced by new video bursts in the configuration 802. Next, the data frames within the video bursts in configuration 802 are removed to reallocate resource to new video bursts in configuration 804. Finally, the video resource within the video frame increases from 7.2 Kbits in configuration 804 to 10.8 Kbits in configuration 806.

In one embodiment, in order to meet the video throughput demand as the number of video streams increases, the system replaces data frames with video frames to form video bursts. The video bursts for different video streams are still transmitted sequentially, possibly with some data frames in between.

In another embodiment, the video burst pattern for a particular video stream is configured in accordance with the overall video throughput demand. As the number of video streams increases, a video bursts pattern is changed into more video centric (i.e., the burst contains fewer data frames). On the other hand, as the number of video streams decreases, a video bursts pattern is changed into less video centric.

In yet another embodiment, the video resource in each video frame is adjusted to meet the video throughput demand. In a video frame, the video resource is augmented by displacing the data resource, either in the time domain or the frequency domain. In a TDD system, the uplink period in the video frame is also reduced if necessary, thereby increasing the downlink video/data resource.

Video Burst Scheduling Signal

In some embodiments the video burst schedule is announced to the subscribing MS's 114. In one embodiment, the video burst schedule is broadcasted periodically at a fixed time and frequency, either in a video frame or in a data frame. An MS 114 that loses the synchronization to the video burst can resynchronize to the burst sequence by decoding the scheduling information. If the video burst schedule changes, all the MS's 114 are to be notified at the earliest possible opportunity.

In another embodiment, the scheduling signal is transmitted in special resource regions. For example, a special message carrying the scheduling signal appears once every 10 seconds in the first data frame. Alternatively, the scheduling signal is transmitted using the first symbol of the video resource in the first video frame of a video burst.

In yet anther embodiment, a frame (sequence) number, which is known to all the control servers is used to represent a synchronized network time by being associated with a common time reference such as the GPS. Such a time reference is also critical to SFN operation. A modular number, instead of the absolute sequence number may be used to reduce the overhead of indicating the frame number.

The video burst scheduling signal may include the following control information for each video stream:

1. the frame number where each video burst starts;
2. the length of each video burst;
3. the pattern of each video burst;
4. the video resource region in each video frame of each video burst; and/or
5. the coding and modulation scheme for each video burst.

In one embodiment, some scheduling information is reduced or omitted or is broadcasted less frequently when it is already known, implied, inferred, or redundant. For example, if the video bursts of a video stream are broadcasted periodically and regularly and the video burst pattern remains unchanged, the scheduling signal is sent out infrequently, for example, once every 10 seconds. This greatly reduces the overhead of scheduling signals.

In another embodiment, to save the air link resource, the schedule information is compressed using a certain technique or be represented via a certain format. In particular, a finite set of video-burst patterns is predefined in the system. The mapping between the video burst patterns and their corresponding pattern indices is broadcasted in a message to all the MS's 114. The pattern index is used to indicate the pattern for each video burst. The mapping is implemented, for example, as in the table shown below:

| Pattern Index | Pattern Format |
| --- | --- |
| 0 | VDVDVDV |
| 1 | VVDVV |

Alternatively, the video burst pattern is expressed in the video burst scheduling signal using bitmap format. A bit of "1" stands for video frame and a bit of "0" stands for data frame or vice versa.

In yet another embodiment, a number of video streams are supported in the system. The mapping between the stream index and its associated video burst scheduling information is implemented, for example, as in the table shown below:

| Stream Index | Associated Scheduling Information |
| --- | --- |
| 1 | Start frame number: 20 |
| | Length of the video burst: 7 |
| | Video burst pattern bitmap: 0x55 (01010101B) |
| | Start symbol No. for video resource: 2 |
| | Number of symbols for video resource: 8 |
| | MCS index for the video resource: 2 (QPSK 1/2 coding) |
| 2 | Start frame number: 40 |
| | Length of the video burst: 5 |
| | Video burst pattern bitmap: 0x15 (00010101B) |
| | Start symbol No. for video resource: 0 |
| | Number of symbols for video resource: 6 |
| | MCS index for the video resource: 4 (16QAM 1/2 coding) |
| ... | ... |
| 10 | Start frame number: 180 |
| | Length of the video burst: 7 |
| | Video burst pattern bitmap: 0x55 (101010101B) |
| | Start symbol No. for video resource: 1 |

-continued

Stream Index Associated Scheduling Information

Number of symbols for video resource: 12
MCS index for the video resource: 2 (QPSK 1/2 coding)

In addition, an application layer message announces the content of the video stream associated with its index, as shown in the following table. Some of the content information, such as the channel and program names, can be used in a video program menu for the user. When a user selects a channel from the menu, the corresponding stream index signals the MS 114 to find the corresponding scheduling information for the video stream.

| Stream Index | Channel Name | Program Name |
|---|---|---|
| 1 | FOX | The Simpsons |
| 2 | CNN | News Update |
| ... | ... | ... |
| 10 | ESPN | Sports Update |

Forward Error Correction for Video Burst

In one embodiment, the FEC (Forward Error Correction) coding block comprises information bits from multiple consecutive video frames within a video burst. Coding across video frames can increase time diversity and therefore improve the performance over fading channels.

Figure 9:
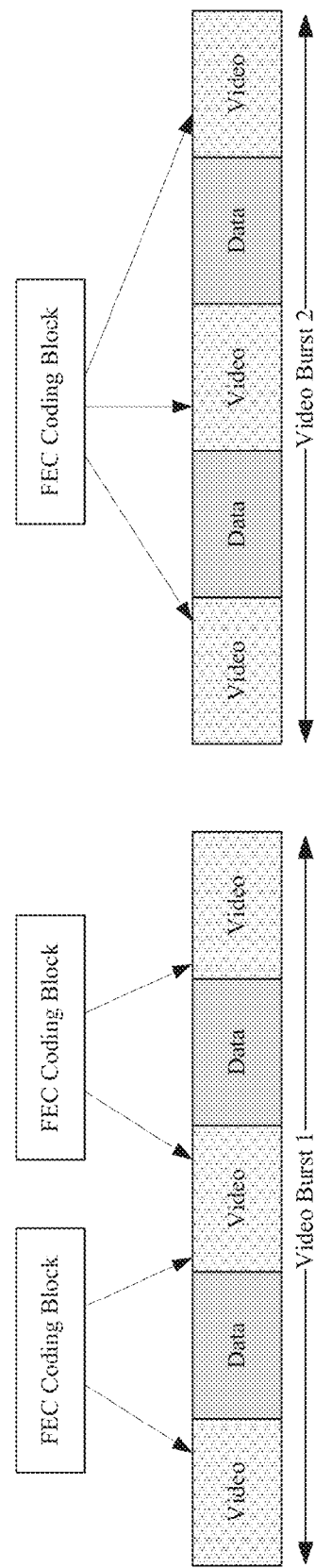
FIG. 9 illustrates an example of FEC (Forward Error Correction) coding configurations with multiple video frames within a video burst.

FIG. 9 illustrates the FEC coding configurations with multiple video frames within a video burst. A coding block in Video burst 1 may consist of bits from two neighboring video frames and a coding block in Video burst 2 may comprise bits concatenated across three neighboring frames.

Auxiliary Video Burst

When additional transmission capacity in either the time or the frequency domain is available, auxiliary video bursts (AVBs) may be used to deliver additional information to enhance video broadcast signals.

In one embodiment, an AVB is transmitted in a redundant form of the original video burst. An AVB can be a simple replica of a video burst itself and when an MS 114 receives the auxiliary video burst, it combines it with its original, using the Chase combining technique, to decode the video signals. An AVB can also carry incremental redundancy information of a video burst. In such a case, the MS 114 fuses the incremental redundancy information to the original video burst, using a predetermined algorithm, to decode the video signals. An MS 114 can elect to receive the video information in the AVB if an error has been detected in the original video burst. The announcement of the scheduling information should include additional information regarding the retransmission.

In another embodiment, an AVB is used to transmit additional video information to improve the video quality. An AVB can be transmitted by the individual BS 101 using multicasting. The BS 101 stores the additional video broadcasting information locally and, if the situation permits (e.g., light local traffic or additional bandwidth available), transmits them as the auxiliary video bursts. The BS 101 is responsible for announcing the scheduling information.

Figure 10:
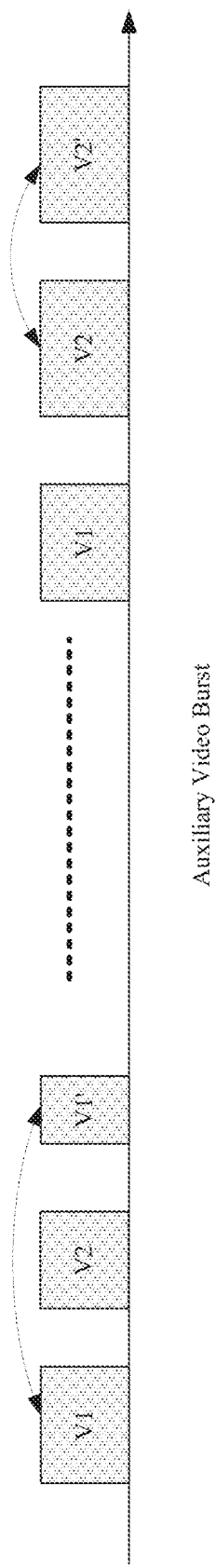
FIG. 10 illustrates how AVBs (auxiliary video bursts) are used with their original video bursts.

FIG. 10 shows an example of the use of AVBs. The MS 114 receiver will jointly decode V1 and V1' using an incremental redundancy algorithm. In the case where V2' is a repetition of V2, the MS 114 receiver uses, for example, the Chase combining algorithm to decode.

Designs for a System with Multiple Frequency Bands

In one embodiment frequency-switch methods and processes are used in a system with multiple frequency bands such that only one RF tuner is needed in the receiving MS 114. A single RF tuner implies that the receiver, regardless of its number of branches, operates in one single RF frequency. For example, some MS's 114 may have multiple branches in their receivers to implement a type of multiple antenna technology, such as diversity combining or multiple-input-multiple-output (MIMO) techniques, but they are referred to as one-RF-tuner receivers.

In another embodiment, when an MS 114 is to switch from a video stream in one frequency band to another video stream in a different frequency band, it triggers the inter-frequency handoff process. Triggering the inter-frequency handoff process hands off the data application associated with the original video stream to be in the switched frequency band.

In yet another embodiment, the data application continues to use the same frequency band when the video stream is switched to another frequency band. The BS 101 scheduler tracks the video frame for each MS 114 and makes resource allocation to avoid simultaneous delivery of the video stream in the video frequency band and other application data in a different data frequency band. The controller in the MS 114 receiver will switch from its data frequency band to video frequency band when its video frame arrives.

In yet another embodiment, when inter-frequency handoff for data application is required, the data application is switched to another frequency channel but the video stream continues transmitting in the original frequency band. The BS 101 scheduler tracks the video frame for each MS and makes resource allocation to avoid simultaneous delivery of the video stream in the video frequency band and other application data in a different data frequency band. The controller in the MS 114 receiver will switch from its data frequency band to video frequency band when its video frame arrives.

In still another embodiment, the system dedicates multiple frequency bands for the video broadcasting application and multiple frequency bands for other applications such as data. In this case an interleaving video frame pattern, called mixed video burst pattern, is used. The mixed video burst pattern will have video frames of different streams interleaved with each other, such as V1-V2-V1-V2-V1-V2. With this configuration, the controller in the MS 114 receiver will switch from its data frequency band to video frequency band when its video burst arrives. The BS 101 scheduler tracks the video frame for each MS 114 and makes resource allocation to avoid simultaneous delivery of the video stream in the video frequency band and other application data in the data frequency band.

Figure 11:
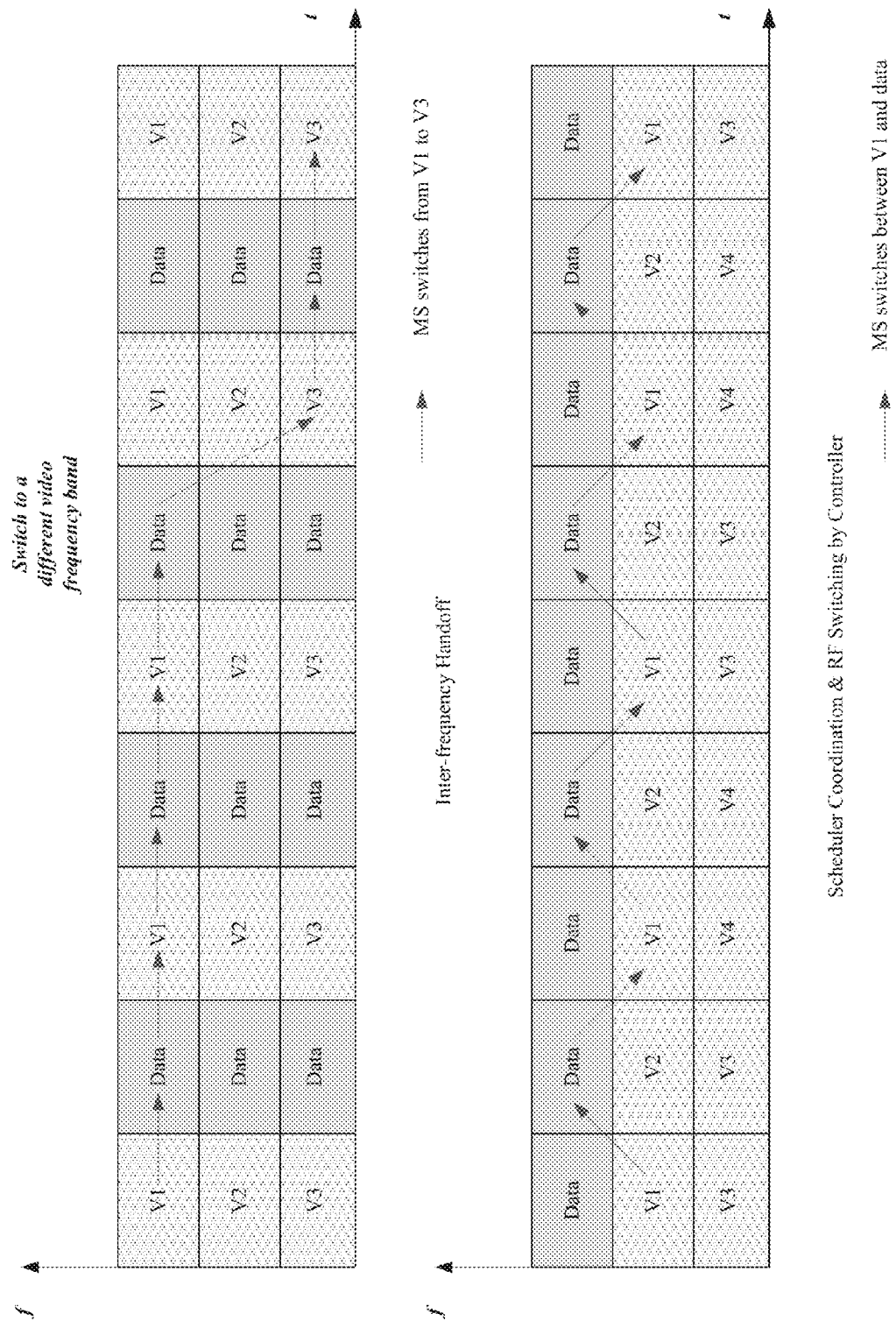
FIG. 11 illustrates using an RF tuner to receive both video and data in a multiple frequency band system.

FIG. 11 shows two examples of using one RF tuner to receive both video and data in a multiple frequency band system. In the first example, both the video and date applications are in a same frequency band. When switching to another video frequency band is requested, the MS 114 triggers the inter-frequency handoff process. In the second example, the video and data transmissions are carried out in different frequency bands. The controller in the receiver handles the switching between different frequency bands. The arrows in FIG. 11 indicate how the controller should switch between the frequency bands.

Figure 12:
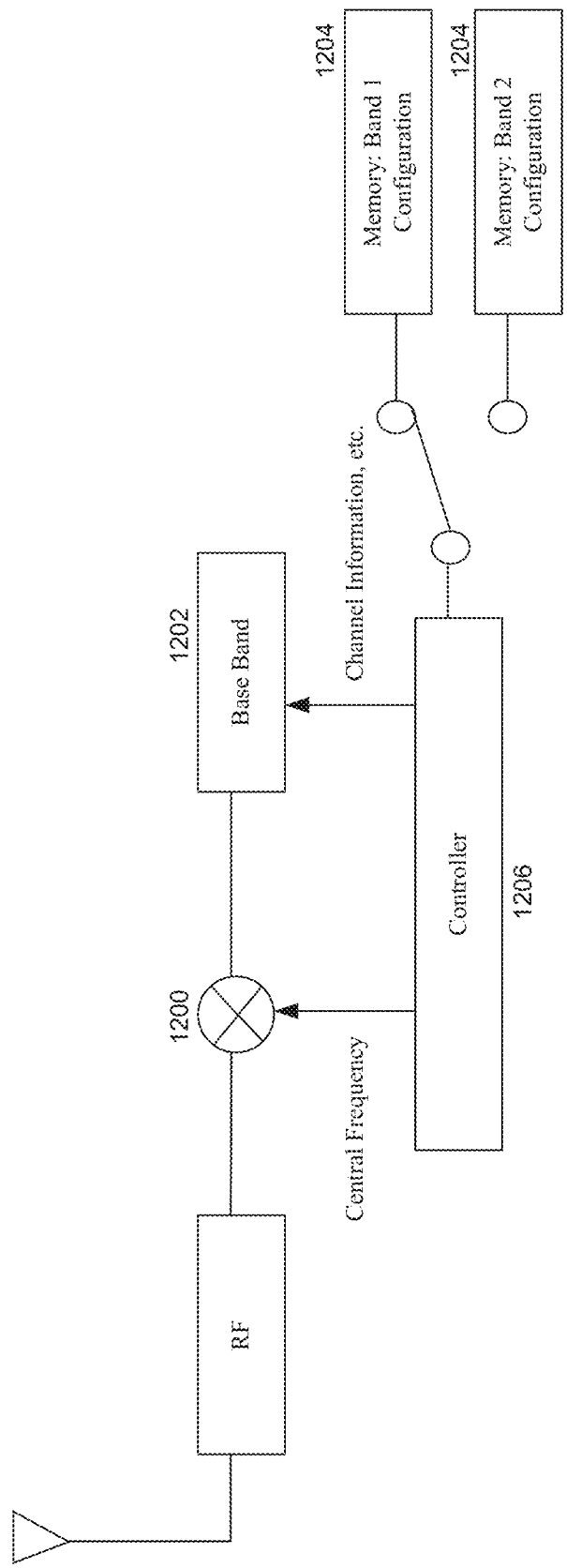
FIG. 12 illustrates a receiver with a single RF tuner in a multiple frequency band system.

FIG. 12 illustrates a receiver with a single RF tuner in a multiple frequency band system. The receiver stores, in its memory 1204, the synthesizer information and the previous channel information for both video frequency band and data frequency band. Based on scheduling information, a controller 1206 determines the switch point between these two frequency band configurations. Once the controller switches to the video frequency band configuration, it applies the control information to the mixer 1200 and the base-band processor 1202.

Receiving Operation

In a typical scenario, a user subscribes to a video broadcasting program, which corresponds to a particular video stream. The content provider and the network service provider will authenticate the request and admit the access by assigning to the MS 114 the key information as well as the video burst scheduling information.

In one embodiment, an MS 114 turns on its receiving and transmitting circuit(s) during its subscribed video bursts and turns off its circuit(s) during the periods in between video bursts. The received video burst is decoded and stored in a video buffer and is later played back on the display.

In another embodiment, an MS 114 with a single RF tuner operates within a multiple-frequency-band system and its controller switches and synchronizes to the data frequency band or the video frequency band when a data frame or a video frame arrives, respectively.

Figure 13:
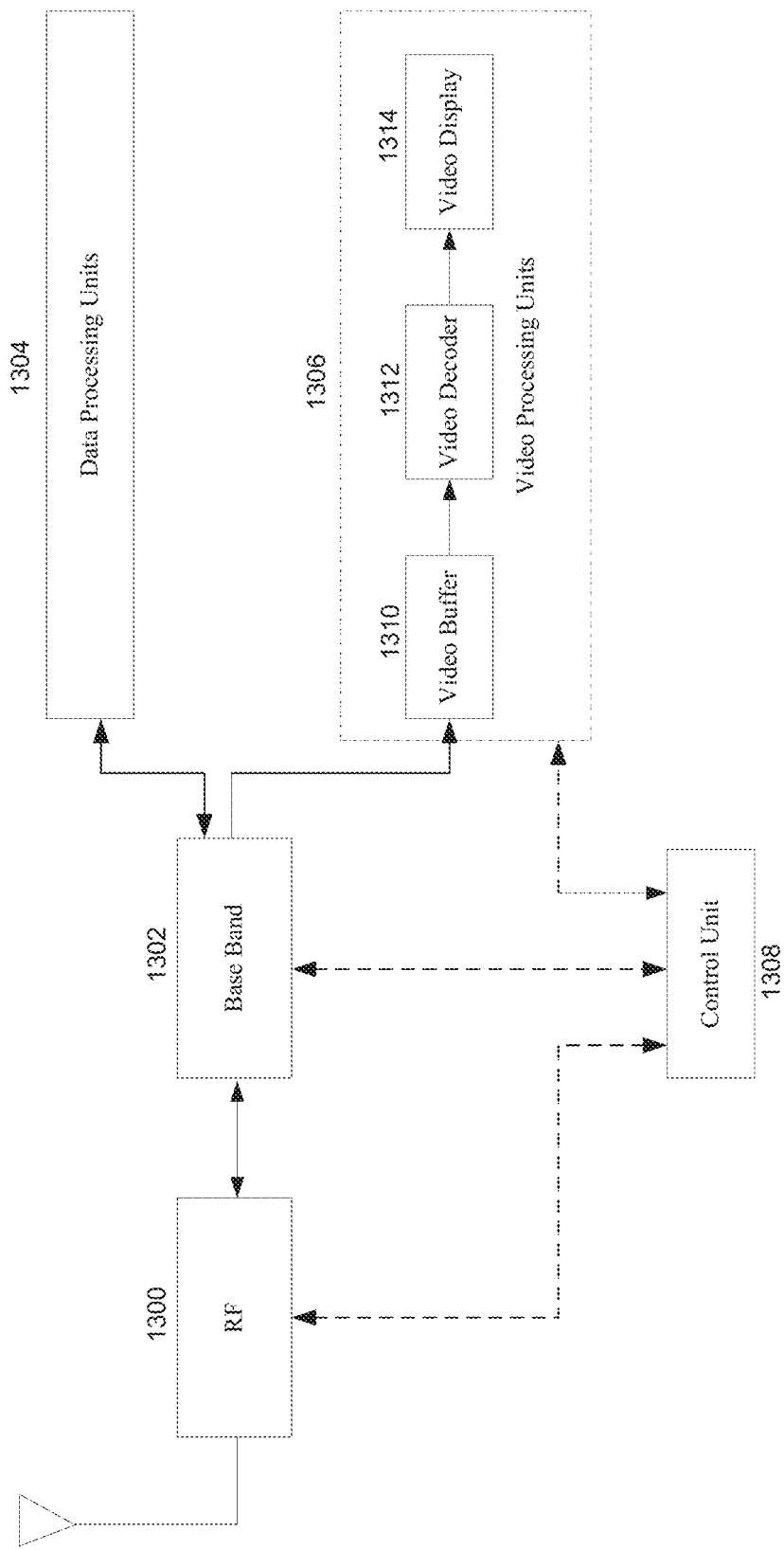
FIG. 13 illustrates a mobile station receiver in a broadcasting and communication system.

FIG. 13 illustrates an MS 114 receiver in a broadcasting and communication system. After the RF transceiver 1300 and base-band 1302 processing, the packets belonging to video broadcasting application are first stored in a video buffer 1310 and, after video decoding 1312, are played back on the video display 1314. Other data application packets are processed along a separate path by the data processing unit 1304. A control unit 1308 controls the RF transceiver 1300, base-band processor 1302, and the operation of the video processing units 1306.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A method for a mobile station in a cellular communication network, the method comprising:
   receiving, from a base station, unicasting data in a first frame via a first frequency band and receiving multicasting or broadcasting content in a second frame via a second frequency band; and
   switching from the first frequency band to a third frequency band for receiving unicasting data in a third frame while maintaining the second frequency band for receiving multicasting or broadcasting content in a fourth frame;
   wherein
      the switching comprises controlling radio frequency (RF) circuitry based on a retrieved RF band configuration stored locally at the mobile station;
      each of the frames has a fixed time length and contains a plurality of time slots, each time slot containing a plurality of orthogonal frequency-division multiplexing (OFDM) symbols;
      a boundary of a frame in the first frequency band or the third frequency band is aligned with a boundary of a frame in the second frequency band;
      the second and fourth frames contain a time-frequency resource used for content multicasting or broadcasting in a single frequency network (SFN), the SFN comprising base stations in multiple cells transmitting the same multicasting or broadcasting content using the same time and frequency resource; and
      the first and third frames contain a time-frequency resource used for data unicasting without the use of a SFN.

2. The method of claim 1, wherein the switching is based on scheduling information received from the base station.

3. The method of claim 1, wherein the second frame contains a first region and a second region, the first region preceding the second region in time, wherein:
   the first region is used for data transmission without the use of SFN and the first region comprises a first number of OFDM symbols; and
   the second region is used for multicasting or broadcasting via SFN and the second region comprises a second number of OFDM symbols.

4. The method of claim 1, wherein the fourth frame contains a first region and a second region, the first region preceding the second region in time, wherein:
   the first region is used for data transmission without the use of SFN and the first region comprises a first number of OFDM symbols; and
   the second region is used for multicasting or broadcasting via SFN and the second region comprises a second number of OFDM symbols.

5. The method of claim 1, wherein the second frequency band is dedicated for multicasting or broadcasting content.

6. The method of claim 1, wherein the multicasting or broadcasting content comprises video, audio, or data.

7. The method of claim 1, wherein the unicasting data comprises non-broadcasting/multicasting application data, including web access data, voice over internet protocol (VoIP) data, or file transfer protocol (FTP) data.

8. The method of claim 1, wherein receiving unicasting data and multicasting or broadcasting content employs orthogonal frequency division multiple access (OFDMA) or frequency division multiple access (FDMA).

9. The method of claim 1, wherein receiving unicasting data and multicasting or broadcasting content employs Time Division Duplexing (TDD) or Frequency Division Duplexing (FDD).

10. A mobile station in a cellular communication network comprising:
    a receiving unit including a radio-frequency (RF) component and a baseband component and configured to receive, from a base station:
        unicasting data in a first frame via a first frequency band ands multicasting or broadcasting content in a second frame via a second frequency band; and
    a controller configured to control the receiving unit to switch from the first frequency band to a third frequency band for receiving unicasting data in a third frame and to maintain the second frequency band for receiving multicasting or broadcasting content in a fourth frame;
    wherein
        controlling the receiving unit to switch comprises controlling the RF component based on a retrieved RF band configuration stored locally at the mobile station;
        each of the frames has a fixed time length and contains a plurality of time slots, each time slot containing a plurality of orthogonal frequency-division multiplexing (OFDM) symbols;
        a boundary of a frame in the first frequency band or the third frequency band is aligned with a boundary of a frame in the second frequency band;
        the second and fourth frames contain a time-frequency resource used for content multicasting or broadcasting in a single frequency network (SFN), the SFN comprising base stations in multiple cells transmitting the same multicasting or broadcasting content using the same time and frequency resource; and
        the first and third frames contain a time-frequency resource used for data unicasting without the use of a SFN.

11. The mobile station of claim 10, wherein the receiving unit comprises a plurality of receiver branches for enabling a diversity combining or multiple-input-multiple-output (MIMO) technique.

12. The mobile station of claim 10, wherein the controller determines a switch point based on scheduling information.

13. The mobile station of claim 10, further comprising a memory unit configured to store RF band configurations.

14. The mobile station of claim 10, further comprising a video decoder and a video display unit.

15. The mobile station of claim 10, further comprising a data processing unit and a buffer, the receiving unit being further configured to separate unicasting data packets and multicasting or broadcasting content packets, wherein unicasting data packets are input to the data processing unit and multicasting or broadcasting content packets are stored in the buffer.

* * * * *

UNITED STATES PATENT AND TRADEMARK OFFICE
CERTIFICATE OF CORRECTION

| | | |
|---|---|---|
| PATENT NO. | : 9,780,959 B2 | Page 1 of 1 |
| APPLICATION NO. | : 14/596109 | |
| DATED | : October 3, 2017 | |
| INVENTOR(S) | : Huang et al. | |

It is certified that error appears in the above-identified patent and that said Letters Patent is hereby corrected as shown below:

In Column 8, Line 3, delete "anther" and insert -- another --, therefor.

In Column 10, Line 55, delete "date" and insert -- data --, therefor.

In Column 13, Line 22, in Claim 10, delete "ands" and insert -- and --, therefor.

Signed and Sealed this
Twenty-second Day of May, 2018

Andrei Iancu
*Director of the United States Patent and Trademark Office*